United States Patent

Grossman

Patent Number: 5,925,200
Date of Patent: Jul. 20, 1999

[54] LABELING METHOD

[75] Inventor: Stanley I. Grossman, London, United Kingdom

[73] Assignee: Rocky Mountain Traders, Ltd., United Kingdom

[21] Appl. No.: 09/035,390

[22] Filed: Mar. 5, 1998

Related U.S. Application Data

[63] Continuation of application No. 08/806,316, Feb. 26, 1997, Pat. No. 5,783,033.

[30] Foreign Application Priority Data

Feb. 26, 1996 [GB] United Kingdom ................ 9604048

[51] Int. Cl.$^6$ ........................................... B32B 31/00
[52] U.S. Cl. ...................... 156/60; 156/391; 156/DIG. 1; 156/DIG. 2
[58] Field of Search ............................... 156/293, 60, 514, 156/391, 538, 579, 69, DIG. 1, DIG. 2; 264/107; 29/271

[56] References Cited

U.S. PATENT DOCUMENTS

| | | |
|---|---|---|
| 1,500,698 | 7/1924 | Wiehl . |
| 1,821,916 | 9/1931 | Acheson et al. . |
| 1,843,140 | 2/1932 | Mills . |
| 2,302,503 | 11/1942 | Proctor . |
| 3,071,381 | 1/1963 | Schneider . |
| 3,165,320 | 1/1965 | Ryan . |
| 3,165,321 | 1/1965 | Osborne et al. . |
| 3,193,295 | 7/1965 | Isemura . |
| 3,223,442 | 12/1965 | Fawdry et al. . |
| 3,436,082 | 4/1969 | Bostrom et al. . |
| 3,509,992 | 5/1970 | David et al. . |
| 3,561,768 | 2/1971 | Castagna . |
| 3,570,661 | 3/1971 | Kersh . |
| 3,687,769 | 8/1972 | Dague . |
| 3,768,815 | 10/1973 | Mathurin . |
| 3,770,908 | 11/1973 | Craggs . |
| 3,871,663 | 3/1975 | Stave . |
| 3,940,793 | 2/1976 | Bleiman . |
| 4,085,178 | 4/1978 | McNeely et al. . |
| 4,171,531 | 10/1979 | Grapes et al. . |
| 4,213,927 | 7/1980 | Alberti . |
| 4,306,344 | 12/1981 | Floss . |
| 4,313,718 | 2/1982 | Llabres et al. . |
| 4,340,955 | 7/1982 | Elliott . |
| 4,358,843 | 11/1982 | Rager . |
| 4,385,460 | 5/1983 | Hanna . |
| 4,408,318 | 10/1983 | Sugiura . |
| 4,420,830 | 12/1983 | Green . |
| 4,470,137 | 9/1984 | Tago . |
| 4,499,516 | 2/1985 | Purdy et al. . |
| 4,514,839 | 4/1985 | Eisemann . |

(List continued on next page.)

FOREIGN PATENT DOCUMENTS

| | | |
|---|---|---|
| 0026475A1 | 10/1979 | European Pat. Off. . |
| 0422774 A2 | 4/1991 | European Pat. Off. . |
| 0553034 A3 | 7/1993 | European Pat. Off. . |
| H5-325495 | 12/1983 | Japan . |
| H2-127230 | 5/1990 | Japan . |
| WO94/13446A1 | 6/1994 | WIPO . |
| WO96/05057A1 | 2/1996 | WIPO . |

*Primary Examiner*—James Engel
*Attorney, Agent, or Firm*—Ohlandt, Greeley, Ruggiero & Perle

[57] ABSTRACT

A compact disc labeling device for manual application of a label to a compact disc includes an assembly having a circumferential flange with an upper flange surface, a piston, a first rod having a diameter approximately equal to the diameter of the label's central aperture and that extends from the upper surface of the piston, and a second rod having a diameter approximately equal to the diameter of the disc's central aperture and that extends from the first rod. In use, a label is placed on the flange with the first rod projecting through its central aperture and the disc positioned on the second rod through its central aperture. When the piston is moved from an upper first position to a lower second position, the disc is applied to the label.

21 Claims, 2 Drawing Sheets

U.S. PATENT DOCUMENTS

| | | |
|---|---|---|
| 4,549,922 | 10/1985 | Oishi et al. . |
| 4,562,570 | 12/1985 | Denton . |
| 4,660,119 | 4/1987 | Kato et al. . |
| 4,687,536 | 8/1987 | Hiramatsu et al. . |
| 4,710,913 | 12/1987 | Matsushima et al. . |
| 4,730,300 | 3/1988 | Kamoshita et al. . |
| 4,871,404 | 10/1989 | Murata et al. . |
| 4,879,437 | 11/1989 | Dard et al. . |
| 4,903,255 | 2/1990 | Sugaya et al. . |
| 4,971,648 | 11/1990 | Doering . |
| 4,983,437 | 1/1991 | Merrick . |
| 5,084,127 | 1/1992 | Nakamura . |
| 5,316,464 | 5/1994 | Lexell . |
| 5,340,427 | 8/1994 | Cusack et al. . |
| 5,346,654 | 9/1994 | Kodaka et al. . |
| 5,412,541 | 5/1995 | Tanaka . |
| 5,417,457 | 5/1995 | Reinhardt . |
| 5,421,950 | 6/1995 | Parrish . |
| 5,435,246 | 7/1995 | Edman . |
| 5,543,001 | 8/1996 | Casillo et al. . |

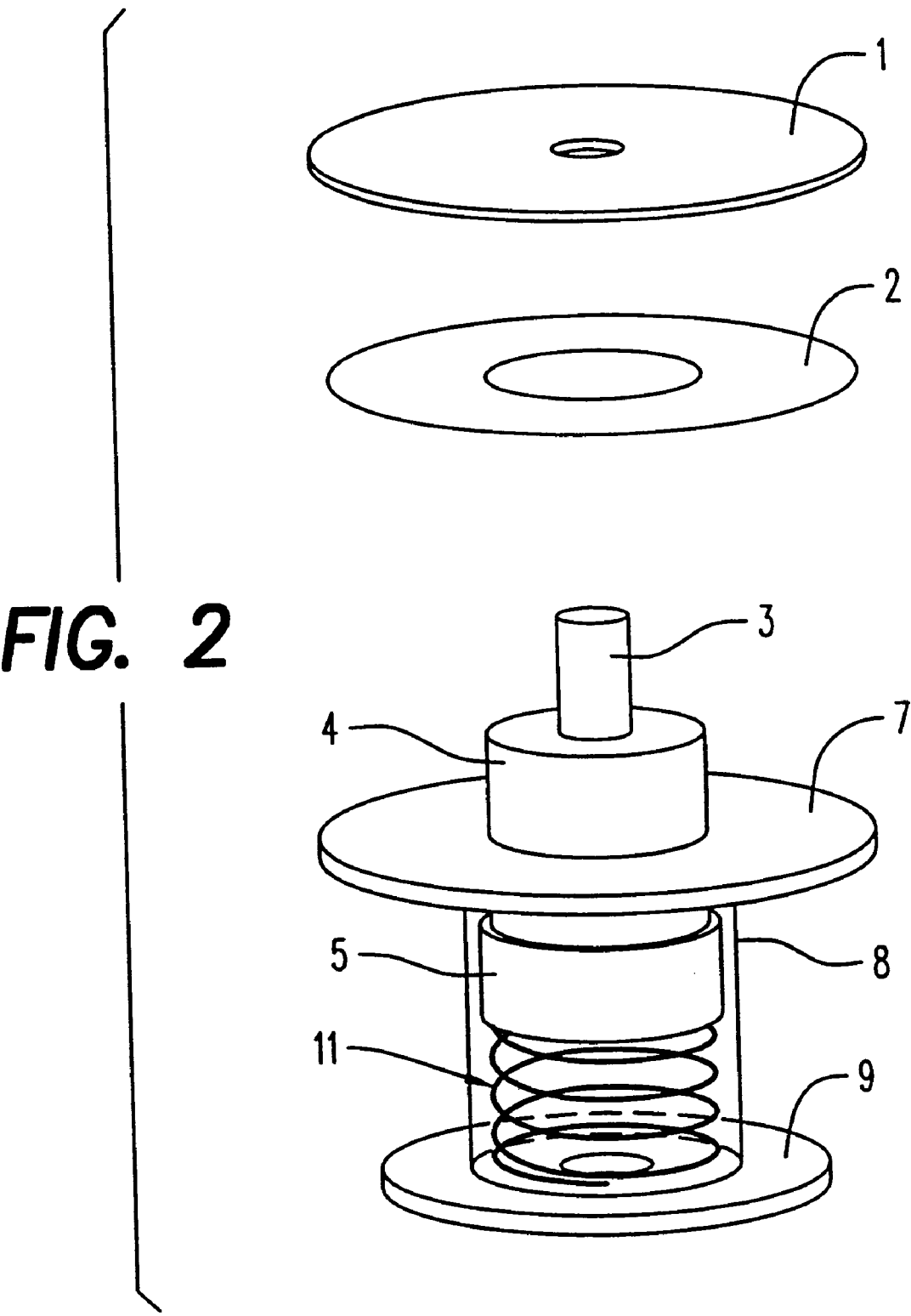

LABELING METHOD

This is a continuation of application Ser. No. 08/806,316, filed Feb. 26, 1997 now U.S. Pat. No. 5,783,033, the disclosure of which is incorporated herein by reference.

FIELD OF THE INVENTION

This invention relates to a device for applying or adhering two substantially planar discs each having a central aperture so that they are concentrically aligned. More specifically, the invention relates to a device for centering and applying labels to compact discs.

BACKGROUND OF THE PRIOR ART

Present electro-optical storage devices include Compact Disc Read Only Memory devices (CD-ROMs) that store digital information. The information is either or both audio and visual in nature. The information can also include data. CD ROMs comprise a plastic or "glass" disc that is coated with a metallic surface. The surface is etched or cut such that when placed in a CD ROM reader and spun at high speed, the etched pattern may be identified by a laser or other scanning method.

By their form, function and manufacture, CD ROMs are generally indistinguishable from one another. It is also generally difficult, if not impossible, to identify the nature or content of the information on a given CD ROM by visual inspection alone. It is therefore necessary to provide CD ROMs with a physical, unique mark or label.

The capability of a CD ROM to faithfully represent the information contained thereon is in large part dependent on the ability of the disc to be placed into a sustained, steady high speed spin about its physical center. This high speed spin presents complications to the marking methods employed.

Traditional ink based marketing methods in which the ink is applied directly to the disc must use an ink that will remain in place during sustained high speed spin. Additionally, the ink must be non-deleterious to the material of the disc. Use of conventional writing instruments, such as felt tip pens, is generally unsatisfactory since the ink may particulate and separate from the disc with the potential for becoming lodged in the mechanism of the disc reader. In addition, marking in this way does not present a professional appearance, especially if the CD ROMs are to be sold or used commercially.

Printers specially adapted for printing onto compact discs are available. However, the cost of such printers is prohibitive to those who produce CD ROMs in low volumes.

An alternative to using an ink marker directly on the disc is to use a label, usually a self-adhesive label, that is subsequently attached to the disc. Because of the high speed at which the disc must be spun, it is essential that the label be affixed in such a way that the overall balance of the disc is not adversely affected. In particular, it is necessary that the center of balance of the disc remains about its geometric center. Labels which are not concentrically affixed to the discs, for example, "half-moon" or semi-circular labels, have previously caused malfunctions and often rendered the discs virtually useless.

A known manual device for concentrically applying a self-adhesive label to a compact disc comprises a first member having a cylinder closed at one end by a slightly convex exterior face with a central aperture corresponding approximately to the size of the central aperture of the label, and a second member having a first portion with a diameter approximate to the diameter of the aperture of the first member and a second portion having a diameter approximate to the diameter of the central aperture of the compact disc. The first and second portions together form a shoulder against which the compact disc is seated.

In use, the operator must initially position an adhesive label on the first member so that its adhesive surface is uppermost. The label aperture is aligned with the central aperture of the end face of the cylinder. This step alone can be difficult because of the tendency of the label to stick to the operator's fingers and hence move off-center when the operator attempts to withdraw his/her fingers in order for the compact disc to be pressed onto the label. Also, there is a tendency for the label to curl upwards when the operator is not holding the label down.

Once the label is in its desired position on the first member, the compact disc which is retained against the shoulder portion of the plunger can be pressed down onto the label. In order to achieve the desired concentric alignment between the label and the disc, it is necessary to press firmly the disc against the shoulder portion while pushing the first portion of the plunger through the aligned apertures of the first member and the label.

Since the surface of the first member against which the label and compact disc are pressed is not planar, further care has to be taken to ensure that no air bubbles are trapped between the label and the disc. Such air bubbles are not only unsightly, but may also cause balancing problems in the CD ROM reader.

It will be appreciated that this known device therefore relies upon the skill and manual dexterity of the operator in order to achieve correct alignment of the label and the compact disc. Moreover, the device is reliant upon the operator being sufficiently well-organized to keep the two components in close proximity ready for use.

Accordingly, it is an object of the present invention to provide a device that overcomes the aforementioned problems and is inexpensive to produce, manually operable, permits reliable alignment of the label and the compact disc, and substantially eliminates the opportunity for operator error.

SUMMARY OF THE INVENTION

The present invention, in a first embodiment, is directed to a unitary device for applying a first substantially planar member having a central aperture of a first diameter to a second substantially planar member having a central aperture of a second diameter. The device includes: an assembly having a circumferential flange with an upper flange surface capable of supporting the first planar member; a piston member having an upper surface; a first rod having a diameter slightly less than the first diameter, extending from the upper surface of the piston member; and a second rod having a diameter slightly less than the second diameter, extending from the first rod. The first diameter is greater than the second diameter. The piston member is adapted to move from a first upward position in which the second rod and at least a portion of the first rod extend above the upper flange surface to a second lower position in which at least the first rod is entirely below, or is level with the upper flange surface so that the first and second members are pressed against each other.

The first and second members can be reliably retained with their respective central apertures in concentric alignment. By moving the piston from first to second positions, the first and second member can be brought together with their alignment maintained. By virtue of the first rod having a substantially similar diameter to the aperture of the first member, the first member can be retained in position on the flange by means of the first rod extending through its aperture. Similarly, the second rod, having a diameter substantially similar to the aperture of the second member, is able to retain the second member in position.

The device may further comprise a tube having an upper end and a lower end. The circumferential flange extends from the upper end of the tube, and the piston member is slidably received in the tube.

A further aspect of the present invention is a compact disc label capable of allowing visual inspection of the disc surface underneath the label. More particularly, the present invention comprises a transparent compact disc label.

BRIEF DESCRIPTION OF THE DRAWINGS

FIG. 2 is a perspective view of the assembled device of FIG. 1 with the first and second planar members in position to be placed on the device.

DESCRIPTION OF THE PREFERRED EMBODIMENTS

Figure 1:
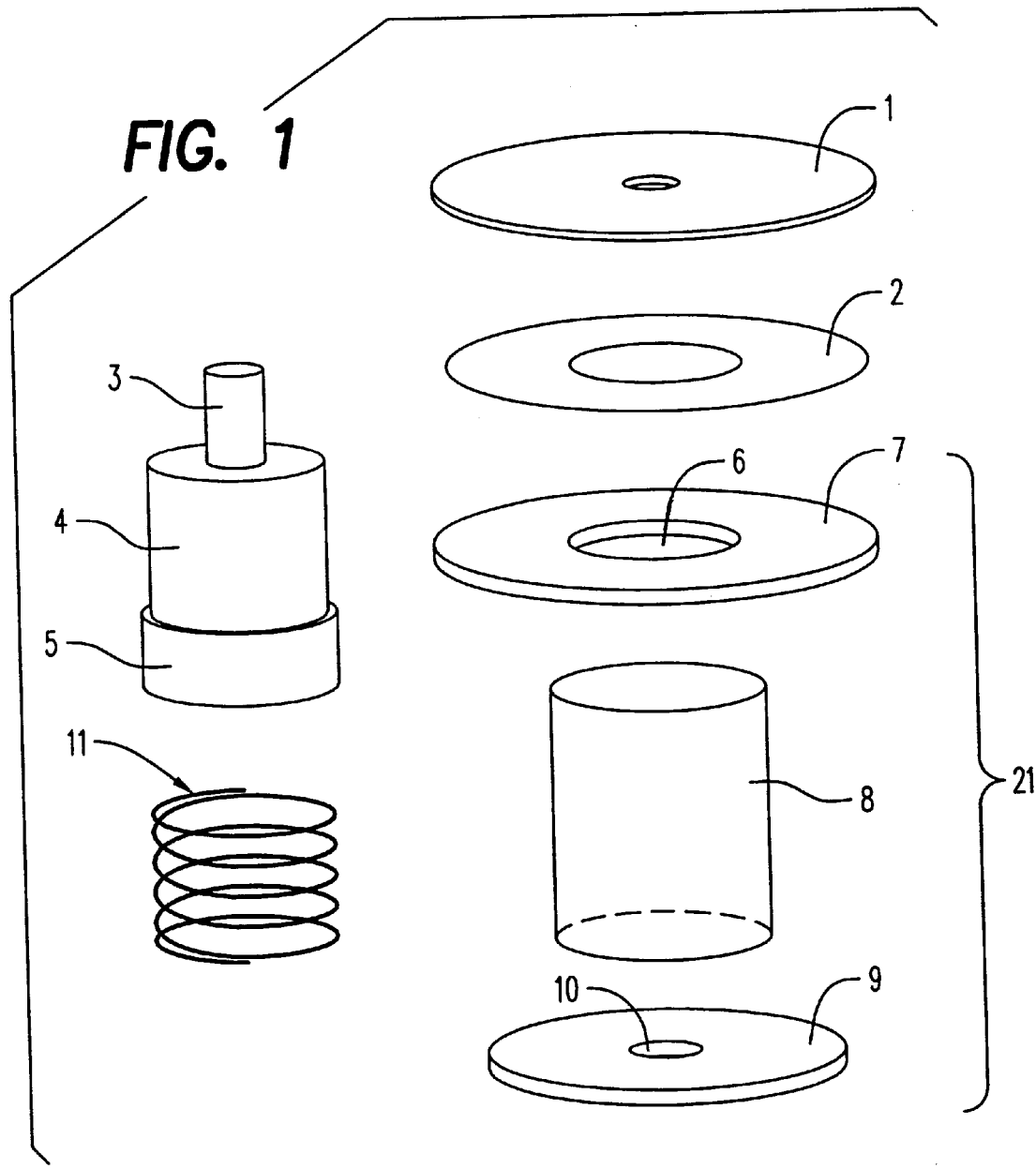
FIG. 1 is an exploded view of one embodiment of the inventive device, illustrating the components of the device, as well as the first and second planar members.

Referring to FIG. 1, the present invention comprises a top cover plate 7 having a central hole 6, a hollow structure, preferably a cylinder 8, and a bottom plate 9. The top plate 7 is affixed to structure 8 such that the structure and central hole 6 are concentrically aligned. In this preferred embodiment, bottom plate 9 is affixed to the lower opening of structure 8. The top plate 7, structure 8 and bottom plate 9 form an enclosed container 21. The container 21 houses the piston assembly. The piston assembly includes a piston 5, a first rod 4, and a second rod 3. The first rod 4 has a concentric outer diameter larger than the diameter of second rod 3. The first rod 4 is connected to second rod 3 and is preferably integral with second rod 3. The second rod 3 extends upwardly above top plate 7. The meeting of second rod 3 to first rod 4 forms a shoulder 14. The piston 5 is free to travel upwardly and downwardly within container 21.

The preferred embodiment of the present invention illustrated in FIG. 1 includes a spring 11 housed within container 21, between bottom plate 9 and piston 5. The spring 11 ensures that piston 5 rests in a fully upward position such that second rod 3 and first rod 4 protrude upwardly through center hole 6 in top plate 7. Ideally, piston 5 is prevented from being withdrawn from the upper end of structure 8. To prevent piston 5 from being withdrawn from structure 8, a collar (not shown) can be provided on the interior of structure 8 at its upper end. More preferably, top plate 7 can extend beyond the interior diameter of structure 8. As shown in FIG. 1, piston 5 has a diameter larger than the diameter of center hole 6 such that during normal operation the piston cannot be removed from the enclosed container 21. In the preferred embodiment the bottom plate 9 has pressure means 10 to provide an, outlet for pressure that may from within the container 21 as a result of movement of piston 5.

The structure 8, as shown in FIG. 1, preferably is a cylinder or tube. However, structure 8 can be any configuration that permits piston 5, along with first and second rods 4, 3, respectively, and spring 11 to move therein free of friction. Accordingly, piston 5, first and second rods 4, 3, respectively, and spring 11 can be any configuration compatible with the interior of structure 8. As shown, structure 8 is cylindrical and is compatible with coiled spring 11 and cylindrical piston 5 and first and second rods 4, 3, respectively.

As shown in FIG. 2, the present invention is used to apply labels to CD ROMs as follows: a label 2 is placed onto top plate 7 with its adhesive side facing upwardly such that second rod 3 and first rod 4 protrude through the center hole of the label. The center hole of a CD ROM 1 is then placed onto second rod 3 with the side to be labeled facing downward toward the adhesive side of label 2 which is resting on top plate 7. The CD ROM 1 is prevented from coming into casual contact with the adhesive side of label 2 because first rod 4 has a diameter that is greater than the diameter of the center hole of the CD ROM.

Gentle downward pressure is applied to second rod 3 to depress piston 5 within container 21 against the action of compression spring 11. The piston 5 is gently deflected downward until the point at which first rod 4 is fully retracted into structure 8. At this point, the CD ROM 1 comes into contact with the adhesive side of label 2. The downward pressure is then gradually released allowing spring 11 to return piston 5 to its resting position making it easy for the user to remove the now labeled CD ROM 1.

In a preferred embodiment, second rod 3 has a diameter of 14 millimeters ±0.5 millimeters, and first rod 4 has a diameter of 41 millimeters ±0.5 millimeters. The top cover 7 has an outer diameter of about 118 to about 120 millimeters. The diameter of central hole 6 is about 41 millimeters plus sufficient clearance to allow passage of first rod 4 through central hole 6. The diameter of bottom plate 9 can be any diameter that permits the device to withstand the pressing operation of securing label 2 to CD ROM 1, and does not allow the device to fall over. For ease of manufacturing, the diameter of bottom plate 9 is approximately the same as that of top plate 7.

The structure 8 has an outside diameter of about 51 millimeters, and an inner diameter of approximately 44 millimeters. The spring 11, which must move frictionlessly in structure 8, has a diameter of about 40 millimeters. The diameter of piston 5, which must move frictionlessly in structure 8, is about 43 millimeters. The diameters of second rod 3 and first rod 4 approximate the diameter of the central aperture of a standard CD ROM, and the diameter of the central aperture of label 2, respectively.

In order to prevent pressure build-up within structure 8 when the piston 5 is depressed, bottom plate 9 can be provided with a pressure release 10. For example, pressure release 10 can be in the form of a hole, to allow air to escape from structure 8. The pressure release 10 can also be provided elsewhere on the device, such as in the wall of structure 8.

For both ease of manufacture and aesthetic purposes, the shape and size of top plate 7 can be identical to that of bottom plate 9. In order not to negate the usefulness of pressure release 10, the underside of the bottom plate 9 can be provided with a plurality of feet to raise the bottom plate from the work surface on which the device is placed. The use of feet can also help reduce the possibility of the device scratching or otherwise damaging the work surface.

The top plate 7 has an upper surface capable of supporting label 2. To achieve this, it is especially advantageous that central hole 6 has a diameter that approximates that of the center hole of label 2. Also, the outer diameter of the upper surface of top plate 7 should be the same or greater than the diameter of label 2. Furthermore, while the upper surface of top plate 7 may be slightly concave, a substantially planar surface is preferred since, when used to apply adhesive labels to compact discs, the planar surface reduces bubble formation and minimizes the flexing of the compact disc. While top plate 7 may have a circular outer radius, this is not essential and other shapes, as may be appropriate to the shape of the planar member to be supported, can be provided.

The second rod 3 extends concentrically from first rod 4. Since second rod 3 is of a smaller diameter than first rod 4, shoulder portion 14 is created where the two rods are joined. The shoulder portion 14 at least partially supports CD ROM 1. Because second rod 3 extends for a length or height greater than the thickness of CD ROM 1, the second rod can also function as a means for depressing piston 5 into cylinder 8. Thus, there is no need for an additional handle or grip means.

The piston 5, second rod 3, and first rod 4 can be joined to each other by any conventional means, such as, for example, adhesive or screws. For ease of manufacture and strength, it is preferable to form piston 5 and first and second rods 4, 3, respectively, in one piece, such as by molding.

Another aspect of the present invention is directed to a method for applying label 2 to a disc, such as CD ROM 1, using the device previously described. The method according to the present invention is suitable for applying labels of varying shapes and sizes to discs. Where it is desired to incorporate as much information as possible on label 2, the label may extend to almost the outer edge of the disc. Alternatively, where the surface area needed to convey the information is not as great, label 2 may be of substantially smaller diameter than that of the disc.

Labels for use on compact discs, such as CD ROM 1, have heretofore been such that information printed on the surface the disc is obscured. This is disadvantageous in situations where it is desired to add information, but at the same time, retain access to the information already provided. Until now, it has been necessary to reproduce the original information together with the additional information on the label to be affixed. Such an operation is both time consuming and increases the chance of introducing errors into the original material.

Therefore, a further aspect of the present invention resides in a compact disc label capable of allowing visual inspection of the surface of CD ROM 1 underneath label 2. More particularly, the present invention comprises a transparent compact disc label.

Not all transparent materials are suitable for application to compact discs. Further, the adhesive used to adhere the label to the disc must be compatible with both CD ROM 1 and label 2. The label material and adhesive must be selected to avoid the bubbling and creasing of label 2 during application of the label to CD ROM 1. It is also important for any such label 2 to be printable by both inkjet and laser printers. According to one aspect of the invention, one side of label 2 is coated with a coating that can receive an inkjet dye or pigment without the dye or pigment smudging or rubbing off.

Advantageously, transparent compact disc label 2 according to the present invention comprises a transparent, flexible polymeric material having a coating of an acrylic-based adhesive on at least one surface. The polymeric material may be a polyester or the like.

While the invention has been described in relation to the fixing of labels onto compact discs, it will be understood that the device according to the invention can be applied to any similar situation where it is desired to concentrically align two or more substantially planar members.

I claim:

1. A method for applying a first substantially planar member having a central aperture of a first diameter to a second substantially planar member having a central aperture of a second diameter smaller than the first diameter, comprising the steps of:

positioning the first member on an upper surface of a receiving plate so that the central aperture of the first member is aligned with an aperture defined in the receiving plate by placing the central aperture of the first member about a first rod having a first end, a second end and a third diameter slightly less than the first diameter, the first rod being located in a first position so as to extend through the aperture in the receiving plate;

inserting a second rod having a fourth diameter slightly less than the second diameter through the central aperture of the second member to position the second member; and pressing the positioned second member against the positioned first member to apply together the first and second members by displacing the second rod against a return force of a resilient member directed against the second end, said displacement being relative to the upper surface from the first position to a second position in which the first end is located either entirely below or level with the upper surface.

2. The method of claim 1, wherein the second rod extends from the first end of the first rod.

3. The method of claim 1, wherein the resilient member is a spring.

4. The method of claim 1, wherein the second end of the first rod has connected thereto a capturing member having a fifth diameter that is larger than the first diameter, and wherein the capturing member is positioned between the receiving plate and the resilient member.

5. A method for applying a first substantially planar member having a central aperture of a first diameter to a second substantially planar member having a central aperture of a second diameter smaller than the first diameter, comprising the steps of:

positioning the first member on an upper surface of a receiving plate so that the central aperture of the first member is aligned with an aperture defined in the receiving plate by placing the central aperture of the first member about a first rod having a first end, a second end and a third diameter slightly less than the first diameter, the first rod being located in a first position so as to extend through the aperture in the receiving plate, the upper surface being maintained in spaced relation above an underlying support surface;

inserting a second rod having a fourth diameter slightly less than the second diameter through the central aperture of the second member to position the second member; and pressing the positioned second member against the positioned first member to thereby apply the first member to the second member by displacing the second rod against a return force of a resilient member disposed between the first rod and the underlying support surface, said displacement being relative to the upper surface from the first position to a second position in which the first end is located either entirely below or level with the upper surface.

6. The method of claim 5, wherein the second rod extends from the first end of the first rod.

7. The method of claim 5, wherein a capturing member having a fifth diameter that is larger than the first diameter is connected to the second end of the first rod and is positioned between the receiving plate and the resilient member.

8. The method of claim 5, wherein the resilient member is a spring.

9. The method of claim 5, wherein the resilient member is held in a housing member having an upper end and a lower end, the upper end being adjacent to the receiving plate and the lower end being adjacent to the underlying support surface.

10. The method of claim 9, wherein the housing member is a tube.

11. The method of claim 5, wherein the second end of the first rod has connected thereto a capturing member having a fifth diameter that is larger than the first diameter, and wherein the capturing member is positioned between the receiving plate and the resilient member.

12. A method for applying a label having an adhesive on one surface thereof and having a central aperture of a first diameter to a compact disk having a central aperture of a second diameter smaller than the first diameter, comprising the steps of:

positioning the label on an upper surface of a label receiving plate so that the adhesive surface of the label is disposed remote from the upper surface and so that the central aperture of the label is aligned with an aperture defined in the receiving plate by placing the central aperture of the label about a first rod having a first end, a second end and a third diameter slightly less than the first diameter, the first rod being located in a first position so as to extend through the aperture of the receiving plate;

inserting a second rod having a fourth diameter slightly less than the second diameter through the central aperture of the compact disk to position the compact disk; and pressing the positioned compact disk against the positioned label to apply together the label and the compact disk by displacing the second rod against a return force of a resilient member directed aginst the second end until the compact disk abuts the adhesive-carrying surface of the label, the displacement being relative to the upper surface from the first position to a second position in which the first end is located either entirely below or level with the upper surface.

13. The method of claim 12, wherein the second rod extends from the first end of the first rod.

14. The method of claim 12, wherein the resilient member is a spring.

15. The method of claim 12, wherein the second end of the first rod has connected thereto a capturing member having a fifth diameter that is larger than the first diameter, and wherein the capturing member is positioned between the receiving plate and the resilient member.

16. A method for applying a label having an adhesive on one surface thereof and having a central aperture of a first diameter to a compact disk having a central aperture of a second diameter smaller than the first diameter, comprising the steps of:

positioning the label on an upper surface of a label receiving plate so that the adhesive surface of the label is disposed remote from the upper surface and so that the central aperture of the label is aligned with an aperture defined in the receiving plate by placing the central aperture of the label about a first rod having a first end, a second end and a third diameter slightly less than the first diameter, the first rod being located in a first position so as to extend through the receiving plate aperture, the upper surface being maintained in spaced relation above an underlying support surface;

inserting a second rod having a fourth diameter slightly less than the second diameter through the central aperture of the compact disk to position the compact disk; and pressing the positioned compact disk against the positioned label to apply together the label and the compact disk by displacing the second rod against a return force of a resilient member disposed between the first rod and the underlying support surface until the compact disk abuts the adhesive surface of the label, the displacement being relative to the upper surface from the first position to a second position in which the first end is located either entirely below or level with the upper surface.

17. The method of claim 16, wherein the second rod extends from the first end of the first rod.

18. The method of claim 16, wherein the second end of the first rod has connected thereto a capturing member having a fifth diameter that is larger than the first diameter, and wherein the capturing member is positioned between the receiving plate and the resilient member.

19. The method of claim 16, wherein the resilient member is a spring.

20. The method of claim 16, wherein the resilient member is held in a housing member having an upper end and a lower end, the upper end being adjacent to the receiving plate and the lower end being adjacent to the underlying support surface.

21. The method of claim 20, wherein the housing member is a tube.

* * * * *